US012570144B2

(12) United States Patent
Maroney et al.

(10) Patent No.: US 12,570,144 B2
(45) Date of Patent: Mar. 10, 2026

(54) HYBRID ELECTRIC HYDRAULIC REFUSE VEHICLE

(71) Applicant: The Heil Co., Chattanooga, TN (US)

(72) Inventors: Stanley L. Maroney, Attalla, AL (US); Robert B. Williams, Albertville, AL (US); Douglas Michael Anders, New Market, AL (US)

(73) Assignee: The Heil Co., Chattanooga, TN (US)

( * ) Notice: Subject to any disclaimer, the term of this patent is extended or adjusted under 35 U.S.C. 154(b) by 468 days.

(21) Appl. No.: 18/169,975

(22) Filed: Feb. 16, 2023

(65) Prior Publication Data

US 2023/0278785 A1 Sep. 7, 2023

Related U.S. Application Data

(60) Provisional application No. 63/317,234, filed on Mar. 7, 2022.

(51) Int. Cl.
B60R 16/033 (2006.01)
B60K 5/00 (2006.01)
(Continued)

(52) U.S. Cl.
CPC ............... B60K 25/02 (2013.01); B60K 5/00 (2013.01); B60K 25/06 (2013.01); B60R 16/033 (2013.01);
(Continued)

(58) Field of Classification Search
CPC ........... B60L 1/003; B60K 1/04; B60K 25/02; B60K 5/00; B60K 25/06; B60K 2025/026;
(Continued)

(56) References Cited

U.S. PATENT DOCUMENTS 2,100,677 A * 11/1937 Wagner .................. B60K 25/06
74/15.86
9,919,702 B1 * 3/2018 Wang .................... B60W 20/40
(Continued)

FOREIGN PATENT DOCUMENTS

CA 3131828 3/2022
CN 106494227 A * 3/2017 ............. F16D 27/14
(Continued)

OTHER PUBLICATIONS

Levis et al. EP 1258382, Machine English translation, ip.com (Year: 2002).*

*Primary Examiner* — Karen Beck

(74) *Attorney, Agent, or Firm* — Fish & Richardson P.C.

(57) ABSTRACT

A refuse vehicle includes a vehicle body on a chassis having a frame, an internal combustion engine (ICE), and a transmission coupling the ICE with a plurality of tractive elements. The vehicle body includes an electrically powered body system and a hydraulically powered body system. A first power module is coupled with the ICE and is configured to provide rotary power to a hydraulic pump that is configured to provide hydraulic power to the hydraulically powered body system. A second power module is coupled with the transmission and configured to rotationally couple and decouple an electrical generator with the transmission. The generator is configured to charge at least one battery when rotationally coupled with the transmission. The battery is configured to provide electrical power to the electrically powered body system.

19 Claims, 9 Drawing Sheets

(51) Int. Cl.

| | |
|---|---|
| *B60K 25/02* | (2006.01) |
| *B60K 25/06* | (2006.01) |
| *F15B 15/18* | (2006.01) |
| *H02J 7/14* | (2006.01) |

(52) U.S. Cl.
CPC ................ *F15B 15/18* (2013.01); *H02J 7/14* (2013.01); *B60K 2025/026* (2013.01)

(58) Field of Classification Search
CPC ....... B60K 25/00; B60R 16/033; F15B 15/18; H02J 7/14; B60F 3/02; B65F 3/14
See application file for complete search history.

(56) References Cited

U.S. PATENT DOCUMENTS

| | | | | |
|---|---|---|---|---|
| 2004/0081014 | A1* | 4/2004 | Chanasyk | ................. B60P 1/00 366/61 |
| 2009/0069154 | A1* | 3/2009 | Wegeng | ................. B60K 25/06 477/111 |
| 2011/0017533 | A1* | 1/2011 | Bissontz | ................ B60K 6/387 180/65.265 |
| 2018/0154773 | A1* | 6/2018 | Dalum | ..................... B60K 6/00 |
| 2020/0247609 | A1 | 8/2020 | Maroney et al. | |
| 2020/0346547 | A1 | 11/2020 | Rocholl et al. | |
| 2020/0346557 | A1 | 11/2020 | Rocholl et al. | |
| 2020/0346854 | A1 | 11/2020 | Rocholl et al. | |
| 2020/0346855 | A1 | 11/2020 | Rocholl et al. | |
| 2020/0346857 | A1 | 11/2020 | Rocholl et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0399057 | A1 | 12/2020 | Rocholl et al. | |
| 2021/0031611 | A1 | 2/2021 | Yakes et al. | |
| 2021/0221216 | A1 | 7/2021 | Yakes et al. | |
| 2021/0229908 | A1 | 7/2021 | Rocholl et al. | |
| 2021/0252995 | A1 | 8/2021 | Rocholl et al. | |
| 2021/0339632 | A1 | 11/2021 | Rocholl et al. | |
| 2022/0097527 | A1 | 3/2022 | Koga et al. | |
| 2022/0097961 | A1 | 3/2022 | Koga et al. | |
| 2022/0097963 | A1 | 3/2022 | Koga et al. | |
| 2022/0097964 | A1 | 3/2022 | Koga et al. | |
| 2022/0118854 | A1 | 4/2022 | Davis et al. | |
| 2022/0169444 | A1 | 6/2022 | Rocholl et al. | |
| 2022/0185582 | A1 | 6/2022 | Koga et al. | |
| 2023/0070279 | A1* | 3/2023 | Wheeler | ................. B60L 58/18 |
| 2024/0157798 | A1* | 5/2024 | Denning | ................. B60L 3/003 |

FOREIGN PATENT DOCUMENTS

| | | | | | |
|---|---|---|---|---|---|
| EP | | 1258382 | A1 * | 11/2002 | .............. F02B 67/06 |
| JP | | 3746900 | B2 * | 2/2006 | ............. B60K 6/543 |
| WO | WO-2016147727 | | A1 * | 9/2016 | ............. F02D 29/02 |

* cited by examiner

Figure 7A:
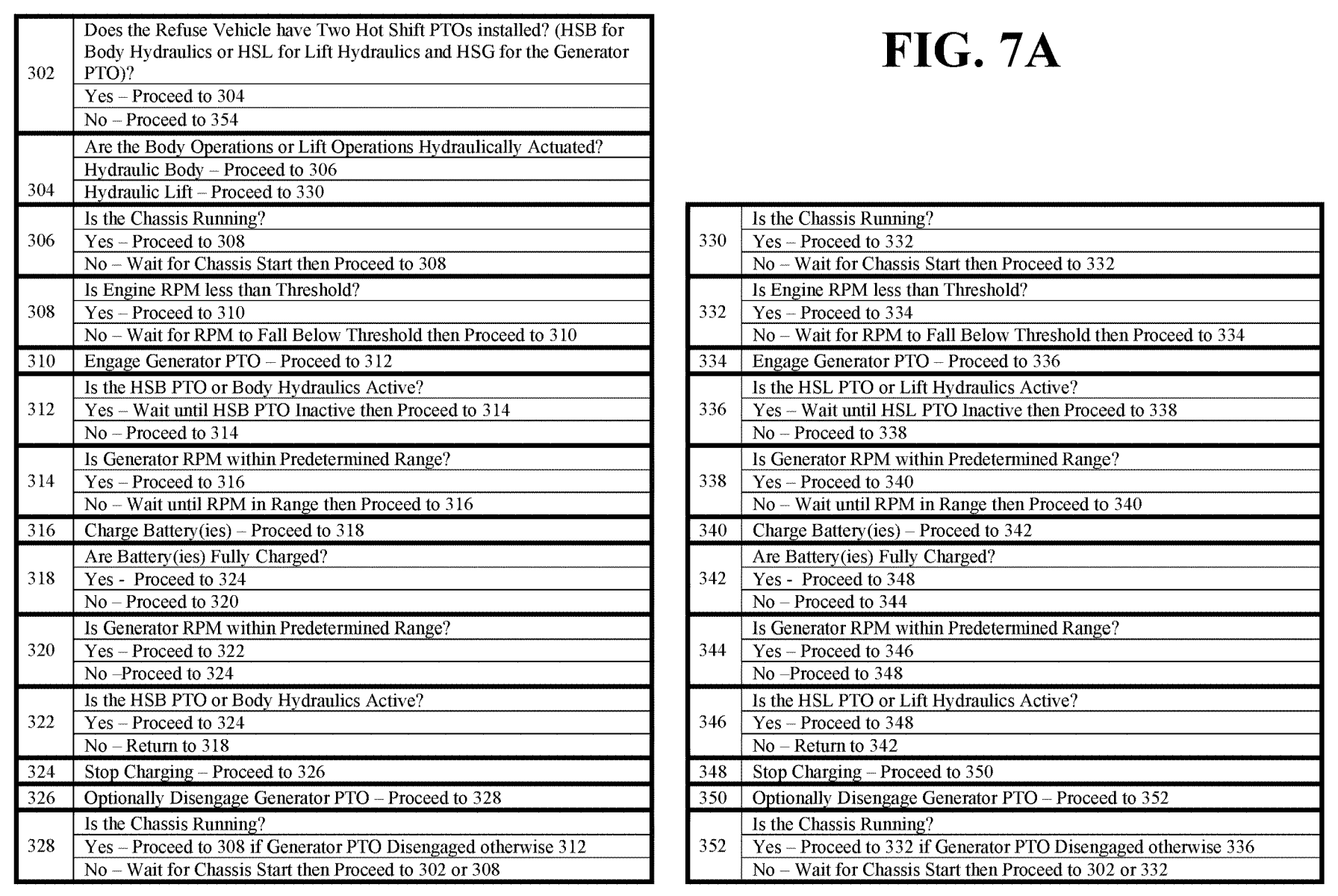

| 302 | Does the Refuse Vehicle have Two Hot Shift PTOs installed? (HSB for Body Hydraulics or HSL for Lift Hydraulics and HSG for the Generator PTO)?<br>Yes – Proceed to 304<br>No – Proceed to 354 |
| 304 | Are the Body Operations or Lift Operations Hydraulically Actuated?<br>Hydraulic Body – Proceed to 306<br>Hydraulic Lift – Proceed to 330 |
| 306 | Is the Chassis Running?<br>Yes – Proceed to 308<br>No – Wait for Chassis Start then Proceed to 308 |
| 308 | Is Engine RPM less than Threshold?<br>Yes – Proceed to 310<br>No – Wait for RPM to Fall Below Threshold then Proceed to 310 |
| 310 | Engage Generator PTO – Proceed to 312 |
| 312 | Is the HSB PTO or Body Hydraulics Active?<br>Yes – Wait until HSB PTO Inactive then Proceed to 314<br>No – Proceed to 314 |
| 314 | Is Generator RPM within Predetermined Range?<br>Yes – Proceed to 316<br>No – Wait until RPM in Range then Proceed to 316 |
| 316 | Charge Battery(ies) – Proceed to 318 |
| 318 | Are Battery(ies) Fully Charged?<br>Yes - Proceed to 324<br>No – Proceed to 320 |
| 320 | Is Generator RPM within Predetermined Range?<br>Yes – Proceed to 322<br>No – Proceed to 324 |
| 322 | Is the HSB PTO or Body Hydraulics Active?<br>Yes – Proceed to 324<br>No – Return to 318 |
| 324 | Stop Charging – Proceed to 326 |
| 326 | Optionally Disengage Generator PTO – Proceed to 328 |
| 328 | Is the Chassis Running?<br>Yes – Proceed to 308 if Generator PTO Disengaged otherwise 312<br>No – Wait for Chassis Start then Proceed to 302 or 308 |

| 330 | Is the Chassis Running?<br>Yes – Proceed to 332<br>No – Wait for Chassis Start then Proceed to 332 |
| 332 | Is Engine RPM less than Threshold?<br>Yes – Proceed to 334<br>No – Wait for RPM to Fall Below Threshold then Proceed to 334 |
| 334 | Engage Generator PTO – Proceed to 336 |
| 336 | Is the HSL PTO or Lift Hydraulics Active?<br>Yes – Wait until HSL PTO Inactive then Proceed to 338<br>No – Proceed to 338 |
| 338 | Is Generator RPM within Predetermined Range?<br>Yes – Proceed to 340<br>No – Wait until RPM in Range then Proceed to 340 |
| 340 | Charge Battery(ies) – Proceed to 342 |
| 342 | Are Battery(ies) Fully Charged?<br>Yes - Proceed to 348<br>No – Proceed to 344 |
| 344 | Is Generator RPM within Predetermined Range?<br>Yes – Proceed to 346<br>No – Proceed to 348 |
| 346 | Is the HSL PTO or Lift Hydraulics Active?<br>Yes – Proceed to 348<br>No – Return to 342 |
| 348 | Stop Charging – Proceed to 350 |
| 350 | Optionally Disengage Generator PTO – Proceed to 352 |
| 352 | Is the Chassis Running?<br>Yes – Proceed to 332 if Generator PTO Disengaged otherwise 336<br>No – Wait for Chassis Start then Proceed to 302 or 332 |

FIG. 7B

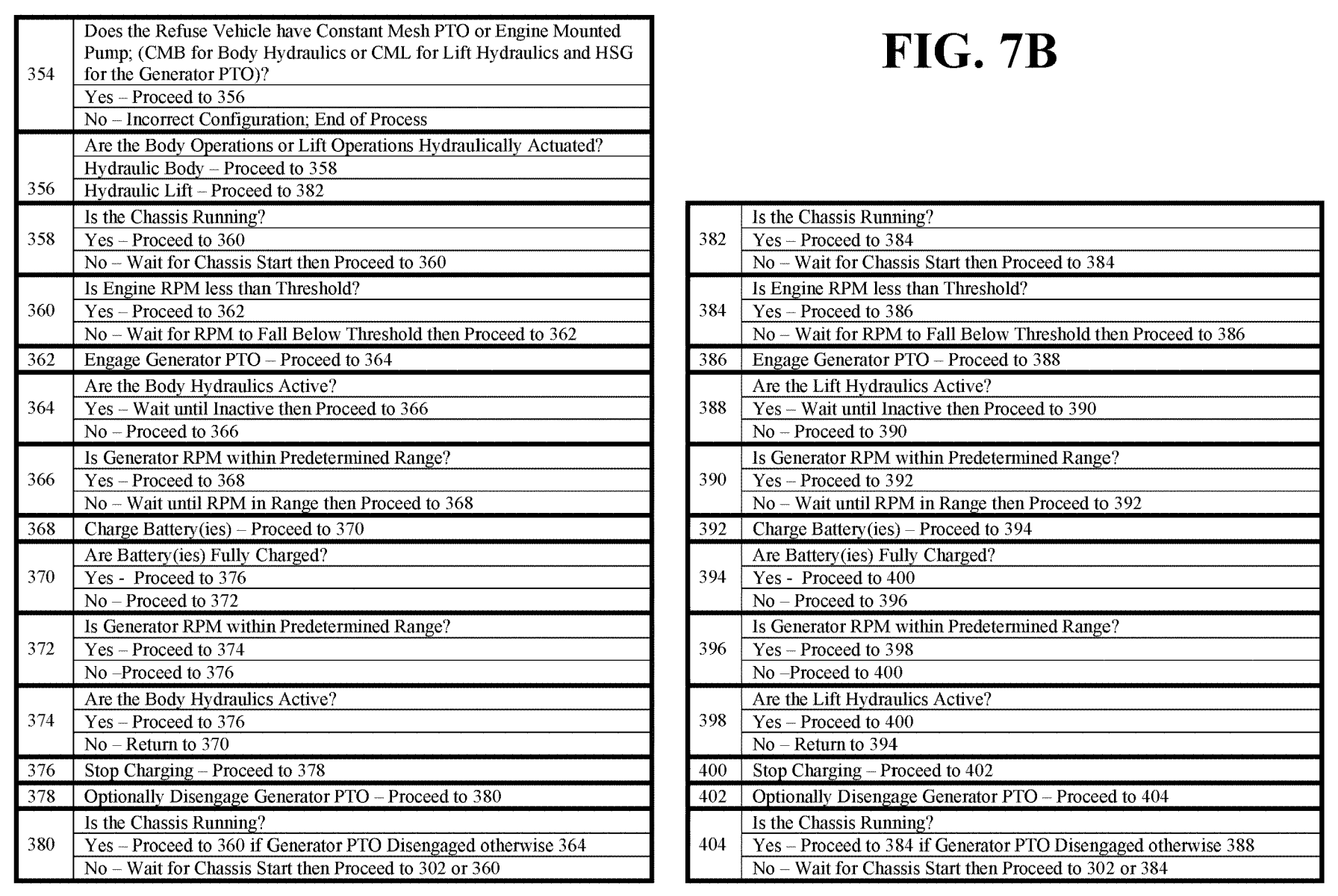

| | |
|---|---|
| 354 | Does the Refuse Vehicle have Constant Mesh PTO or Engine Mounted Pump; (CMB for Body Hydraulics or CML for Lift Hydraulics and HSG for the Generator PTO)?<br>Yes – Proceed to 356<br>No – Incorrect Configuration; End of Process |
| 356 | Are the Body Operations or Lift Operations Hydraulically Actuated?<br>Hydraulic Body – Proceed to 358<br>Hydraulic Lift – Proceed to 382 |
| 358 | Is the Chassis Running?<br>Yes – Proceed to 360<br>No – Wait for Chassis Start then Proceed to 360 |
| 360 | Is Engine RPM less than Threshold?<br>Yes – Proceed to 362<br>No – Wait for RPM to Fall Below Threshold then Proceed to 362 |
| 362 | Engage Generator PTO – Proceed to 364 |
| 364 | Are the Body Hydraulics Active?<br>Yes – Wait until Inactive then Proceed to 366<br>No – Proceed to 366 |
| 366 | Is Generator RPM within Predetermined Range?<br>Yes – Proceed to 368<br>No – Wait until RPM in Range then Proceed to 368 |
| 368 | Charge Battery(ies) – Proceed to 370 |
| 370 | Are Battery(ies) Fully Charged?<br>Yes - Proceed to 376<br>No – Proceed to 372 |
| 372 | Is Generator RPM within Predetermined Range?<br>Yes – Proceed to 374<br>No – Proceed to 376 |
| 374 | Are the Body Hydraulics Active?<br>Yes – Proceed to 376<br>No – Return to 370 |
| 376 | Stop Charging – Proceed to 378 |
| 378 | Optionally Disengage Generator PTO – Proceed to 380 |
| 380 | Is the Chassis Running?<br>Yes – Proceed to 360 if Generator PTO Disengaged otherwise 364<br>No – Wait for Chassis Start then Proceed to 302 or 360 |
| 382 | Is the Chassis Running?<br>Yes – Proceed to 384<br>No – Wait for Chassis Start then Proceed to 384 |
| 384 | Is Engine RPM less than Threshold?<br>Yes – Proceed to 386<br>No – Wait for RPM to Fall Below Threshold then Proceed to 386 |
| 386 | Engage Generator PTO – Proceed to 388 |
| 388 | Are the Lift Hydraulics Active?<br>Yes – Wait until Inactive then Proceed to 390<br>No – Proceed to 390 |
| 390 | Is Generator RPM within Predetermined Range?<br>Yes – Proceed to 392<br>No – Wait until RPM in Range then Proceed to 392 |
| 392 | Charge Battery(ies) – Proceed to 394 |
| 394 | Are Battery(ies) Fully Charged?<br>Yes - Proceed to 400<br>No – Proceed to 396 |
| 396 | Is Generator RPM within Predetermined Range?<br>Yes – Proceed to 398<br>No – Proceed to 400 |
| 398 | Are the Lift Hydraulics Active?<br>Yes – Proceed to 400<br>No – Return to 394 |
| 400 | Stop Charging – Proceed to 402 |
| 402 | Optionally Disengage Generator PTO – Proceed to 404 |
| 404 | Is the Chassis Running?<br>Yes – Proceed to 384 if Generator PTO Disengaged otherwise 388<br>No – Wait for Chassis Start then Proceed to 302 or 384 |

HYBRID ELECTRIC HYDRAULIC REFUSE VEHICLE

CROSS-REFERENCE TO RELATED APPLICATIONS

This application claims the benefit under 35 U.S.C. § 119 (e) of U.S. Patent Application No. 63/317,234, entitled "HYBRID ELECTRIC HYDRAULIC REFUSE VEHICLE," filed Mar. 7, 2022, which is incorporated herein by reference in its entirety.

FIELD OF THE INVENTION

Disclosed embodiments relate generally to refuse collection vehicles and more particularly to refuse vehicles employing electrically actuated and hydraulically actuated body systems.

BACKGROUND INFORMATION

Refuse vehicles have long serviced homes and businesses in urban, residential, and rural areas. Collected waste is commonly transported to a landfill, an incinerator, a recycling plant, or some other facility. Refuse vehicles commonly include numerous vehicle body systems to perform vital vehicle functions. Such systems commonly include a refuse collection system, such as front load and side load assemblies, a refuse packing (or compaction) and ejector assembly, and a tailgate open and close assembly.

Historically, refuse vehicles have employed diesel powered engines to propel the vehicle and a power takeoff (PTO) or engine mounted pump that provides hydraulic actuation of the above noted vehicle body systems. While such refuse vehicles have long been serviceable, there is a need for further improvements.

SUMMARY

Refuse vehicles are disclosed. For example, disclosed embodiments may include a vehicle body on a chassis having a frame, an internal combustion engine (ICE), and a transmission coupling the ICE with a plurality of tractive elements. The vehicle body includes at least one electrically powered body system and at least one hydraulically powered body system. The body systems are selected from a group consisting of a tailgate, a lift assembly, a refuse packing assembly, a refuse ejection assembly, and a carry can. A first power module is operatively coupled with the ICE and is configured to provide rotary power to a hydraulic pump that is in turn configured to provide hydraulic power to the hydraulically powered body system. A second power module is coupled with the transmission and configured to rotationally couple and decouple an electrical generator with the transmission. The generator is configured to charge a battery when rotationally coupled with the transmission. The battery is configured to provide electrical power to the electrically powered body system.

In another embodiment, a refuse vehicle includes a power module coupled with the transmission and configured to rotationally couple and decouple a generator with the transmission. The generator is configured to charge a battery when rotationally coupled with the transmission. The battery is configured to provide electrical power to the electrically powered body system. The vehicle further includes a controller configured to disable battery charging when one of the hydraulically actuated body systems is active.

One aspect of the present disclosure features a refuse vehicle including: a vehicle chassis, the vehicle chassis including a chassis frame, an internal combustion engine (ICE), and a transmission coupling the ICE with a plurality of tractive elements; a vehicle body on the vehicle chassis, the vehicle body including a refuse container and further including at least one electrically-powered body system and at least one hydraulically-powered body system, said body systems selected from a group consisting of a tailgate, a lift assembly, a refuse packing assembly, a refuse ejection assembly, and a carry can; a first power module operatively coupled with the ICE, the first power module configured to provide rotary power to a hydraulic pump that is configured to provide hydraulic power to the at least one hydraulically-powered body system; and a second power module coupled with the transmission, the second power module configured to rotationally couple and decouple a generator with the transmission, the generator configured to charge at least one battery when rotationally coupled with the transmission, the at least one battery configured to provide electrical power to the at least one electrically-powered body system.

In some embodiments, the at least one electrically-powered body system comprises at least one of the lift assembly and the carry can.

In some embodiments, the at least one hydraulically-powered body system comprises at least one of the tailgate, the refuse packing assembly, and the refuse ejection assembly, and wherein the ICE is a natural gas-powered ICE, a propane-powered ICE, a gasoline-powered ICE, or a diesel-powered ICE.

In some embodiments, the second power module comprises a first power take off (PTO) configured for selective engagement and disengagement with the transmission, the first PTO configured to provide rotary power to the generator when engaged with the transmission.

In some embodiments, the first power module comprises a second PTO configured for selective engagement and disengagement with the transmission, the second PTO configured to provide rotary power to the hydraulic pump when engaged with the transmission.

In some embodiments, at least one of the first PTO and the second PTO comprises a hot-shift PTO.

In some embodiments, the second power module comprises a constant mesh PTO engaged with the transmission and a clutch deployed between the constant mesh PTO and the generator, the clutch configured to rotationally couple and decouple the generator with constant mesh PTO and the transmission.

In some embodiments, the hydraulic pump is an engine mounted pump and the first power module comprises a coupling between the ICE and the engine mounted pump.

In some embodiments, the first power module comprises a constant mesh PTO engaged with the transmission and configured to provide rotary power to the hydraulic pump.

In some embodiments, the first power module comprises a hot-shift PTO configured for selective engagement and disengagement with the transmission.

In some embodiments, the refuse vehicle further includes a continuous variable transmission (CVT) deployed between the second power module and the generator, the CVT configured to adjust a rotation rate ratio between an output shaft of the second power module and an input generator shaft.

In some embodiments, the refuse vehicle further includes a controller configured to cause the second power module to rotationally couple the generator with the transmission when the ICE is running at a rotation rate below a threshold rate.

In some embodiments, the controller is further configured to disable battery charging when the at least one hydraulically-powered body system is active.

In some embodiments, the controller is further configured to cause the generator to charge the at least one battery when the second power module is rotationally coupling the generator with the transmission and when a generator rotation rate is within a predetermined range of rotation rate values.

In some embodiments, the refuse vehicle further includes a switch configured to make and break an electrical connection between the generator and the at least one battery, wherein the switch is closed by the controller when the generator rotation rate is within the predetermined range of rotation rate values thereby providing AC power to a battery charger which in turn provides DC power to the at least one battery, wherein the controller is configured to open the switch when a demand is sensed.

Yet another aspect of the present disclosure features a refuse vehicle including: a vehicle chassis, the vehicle chassis including a chassis frame, an internal combustion engine (ICE), and a transmission coupling the ICE with a plurality of tractive elements; a vehicle body on the vehicle chassis, the vehicle body including a refuse container and further including at least one electrically-powered body system and at least one hydraulically-powered body system, said body systems selected from a group consisting of a tailgate, a lift assembly, a refuse packing assembly, a refuse ejection assembly, and a carry can; a power module coupled with the transmission, the power module configured to rotationally couple and decouple a generator with the transmission, the generator configured to charge at least one battery when rotationally coupled with the transmission, the at least one battery configured to provide electrical power to the at least one electrically-powered body system; and a controller configured to disable battery charging when the at least one hydraulically-powered body system is active.

In some embodiments, the refuse vehicle further includes a switch configured to make and break an electrical connection between the generator and the at least one battery, wherein the switch is closed by the controller when the at least one hydraulically-powered body system is active.

In some embodiments, the controller is configured to disable battery charging when a vehicle computer system issues a command to actuate the hydraulically-powered body system.

In some embodiments, the controller is configured to disable battery charging when actuation of the hydraulically-powered body system is sensed via at least one vehicle sensor selected from the group consisting of a pressure sensor, a hydraulic piston position sensor, and a proximity sensor.

In some embodiments, the refuse vehicle further includes a first hot shift power take off (PTO) configured for selective engagement and disengagement with the transmission, the first hot shift PTO configured to provide rotary power to a hydraulic pump when engaged with the transmission, wherein the power module comprises a second hot shift PTO configured for selective engagement and disengagement with the transmission, the second PTO configured to rotationally couple the generator with the transmission, and thereby provide rotary power to the generator, when engaged with the transmission.

This summary is provided to introduce a selection of concepts that are further described below in the detailed description. This summary is not intended to identify key or essential features of the claimed subject matter, nor is it intended to be used as an aid in limiting the scope of the claimed subject matter. Other features, objects, and advantages of the invention will be apparent from the description and drawings, and from the claims.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 7A and 7B (collectively FIG. 7) depict an alternative flow diagram including a controller decision tree (controller logic) for a control method suitable for use with either or both of the refuse vehicles depicted on FIGS. 3A and 3B.

DETAILED DESCRIPTION

Figure 1:
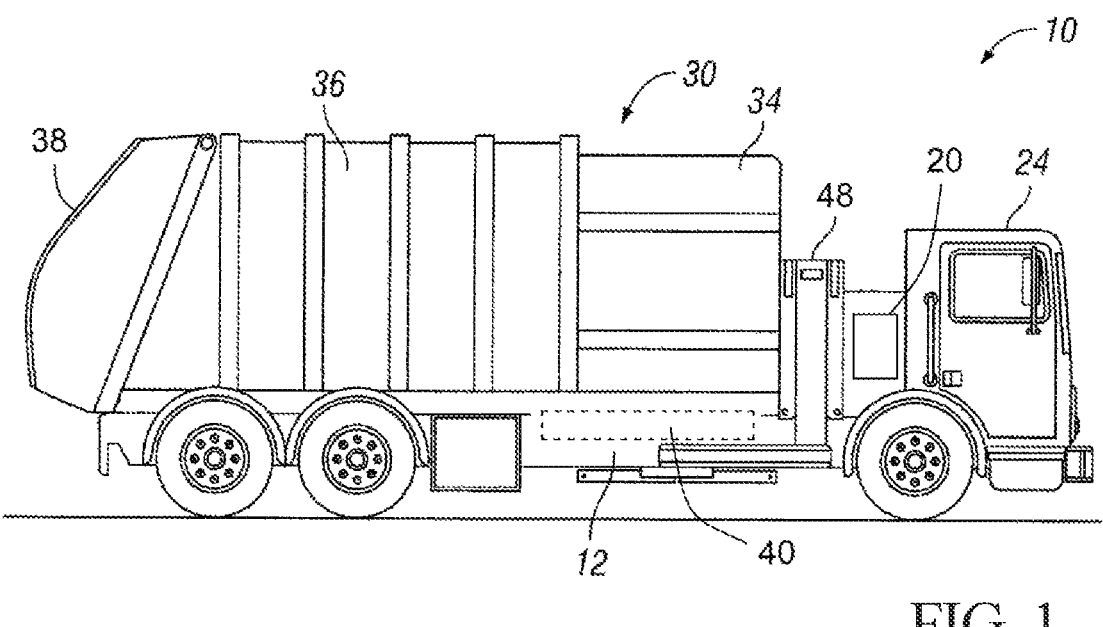
FIG. 1 depicts one example refuse vehicle including at least one electrically actuated body system and at least one hydraulically actuated body system.

Hybrid refuse vehicles including at least one electrically actuated body system and at least one hydraulically actuated body system are disclosed. Disclosed refuse vehicles may include a vehicle body on a chassis having a chassis frame, an internal combustion engine (ICE), and a transmission coupling the ICE with a plurality of tractive elements. The vehicle body may include a refuse container, at least one electrically powered body system, and at least one hydraulically powered body system. The body systems are selected from a group consisting of a tailgate, a lift assembly, a refuse packing assembly, a refuse ejection assembly, and a carry can. A power module is operatively coupled with the ICE and provides rotary power to a hydraulic pump that is configured to provide hydraulic power to the one hydraulically powered body system. In certain embodiments a power take off (PTO) is configured for selective engagement and disengagement with the transmission. The PTO is configured to provide rotary power to a generator when engaged with the transmission. The generator is configured to charge one rechargeable battery that in turn powers the one electrically powered body system. The power module may optionally also include a PTO configured for selective engagement and disengagement with the transmission and further configured to provide rotary power to the hydraulic pump when engaged with the transmission.

In certain advantageous embodiments, the electrically actuated body systems may include, for example, an electrically actuated lift assembly and/or an all-electric carry can. In such embodiments, the hydraulically actuated body systems may include, for example, a hydraulically actuated tailgate, a hydraulically actuated packer assembly, and/or a hydraulically actuated ejector assembly.

Disclosed refuse vehicles may further include a power management controller configured to control the battery charging operation. The controller may be configured, for example, to cause the PTO to engage with the transmission when the ICE is running at a rotation rate below a threshold rate. The controller may be further configured to cause the generator to charge the battery when the PTO is engaged with the transmission and when the generator rotation rate is within a predetermined range of rotation rate values. In example embodiments, the controller may close a switch when the generator rotation rate is within the predetermined range of rotation rate values. Closing the switch establishes an electrical connection between the generator and the battery(ies) such that the generator may provide AC power to a battery charger which in turn provides DC power to the battery (thereby charging the battery). The controller may be further configured to disable charging when one of the hydraulically powered body system(s) is active (e.g., by opening the switch and breaking the connection between the generator and the battery charger).

The disclosed embodiments may advantageously reduce the number of hydraulically actuated components (and therefore the number of hydraulic pistons) in a refuse vehicle (as compared to a conventional fully hydraulic vehicle). The disclosed vehicle embodiments make use of selective (and recurrent) battery charging and therefore may employ smaller and less expensive battery system(s) than vehicles that use off-line battery charging systems. Moreover, the disclosed vehicle embodiments make use of a smart battery charging system that is intended to balance hydraulic and electric generator demand so as to avoid engine overload.

Turning now to FIG. 1, one example refuse vehicle 10 is depicted including at least one electrically actuated body system in accordance with the disclosed embodiments. The depicted vehicle 10 includes a vehicle body 30 and a cab 24 deployed on a chassis (or frame) 12. In this particular embodiment, the chassis 12 is powered by an internal combustion engine (ICE) such as a liquid natural gas (LNG), a compressed natural gas (CNG), a diesel, a propane, or a gasoline powered ICE configured to provide rotary power to one or more tractive elements (e.g., rear tires) and thereby propel the vehicle 10. The vehicle body 30 may define a refuse container, which in the depicted embodiment includes a hopper 34 and a storage container 36 (with the hopper 34 located between the storage container 36 and the cab 24). A tailgate 38 is deployed on a rearward facing end of the body 30 and is configured to open and close the storage container 36 to the outside world. For example, the tailgate 38 may be pinned or hinged such that it rotates about a hinge between closed (as depicted) and open positions.

With continued reference to FIG. 1, the vehicle body 30 may be equipped with a number of actuated body systems that provide refuse vehicle functionality. For example, vehicle body 30 may include (i) a mechanism to open and close (and optionally lock) the tailgate 38, (ii) a refuse loading assembly or "lift" (e.g., a front loading assembly, a side loading assembly, or a rear loading assembly), (iii) a refuse packing assembly (a packer) configured to remove refuse from the hopper 34 and to compact the refuse in the storage container 36, and (iv) a refuse ejection assembly (an ejector) configured to eject refuse from the storage container 36 when the tailgate 38 is open. It will be appreciated that in certain embodiments, the packer and ejector assemblies may be the same assembly and may be configured to pack refuse in the storage container and eject the refuse when the tailgate is open. Such assemblies are commonly referred to in the industry simply as an ejector or a packer. The vehicle body may further include a carry can (e.g., including a side loader) deployed on a front loading assembly (e.g., on forks coupled with the front loading assembly).

In certain disclosed embodiments, vehicle body 30 includes at least one electrically actuated body system and at least one hydraulically actuated body system. By electrically actuated it is meant that the electrically actuated body system includes at least one electrically powered actuator that utilizes electrical energy to translate or rotate various body system components. The electrical energy may be provided, for example, via a rechargeable battery deployed on the chassis 12 or on the vehicle body 30. By hydraulically actuated it is meant that the hydraulically actuated body system is powered via fluid pressure, for example, utilizing one or more pistons to translate or rotate various body system components. The hydraulic power may be provided, for example, via a hydraulic fluid container and a hydraulic pump deployed on the chassis 12 or the vehicle body 30.

The refuse vehicle 10 may include substantially any combination of electrically actuated and hydraulically actuated body systems. For example, in one embodiment the vehicle body 30 may include an electrically actuated lift and a hydraulically actuated tailgate and ejector. In another embodiment, the vehicle body 30 may include an electrically actuated carry can deployed on an electrically actuated or hydraulically actuated front loader assembly and a hydraulically actuated tailgate and ejector. In still another embodiment, the vehicle body 30 may include an electrically actuated ejector and a hydraulically actuated lift and tailgate. In yet another embodiment, the vehicle body 30 may include an electrically actuated lift and packer (e.g., an auger) and a hydraulically actuated tailgate and ejector. It will be appreciated that the disclosed embodiments are not limited regarding which of the body systems is/are electrically actuated and which is/are hydraulically actuated.

With continued reference to FIG. 1, it will be further appreciated that the disclosed embodiments are not limited to hybrid vehicles including both electrically actuated and hydraulically actuated body systems as described above. Certain of the disclosed vehicle embodiments may include an ICE powered chassis (e.g., a compressed or liquid natural gas-powered ICE) and an all-electric vehicle body. By all-electric it is meant that the major systems in the vehicle body are electrically actuated (e.g., the vehicle body includes an electrically actuated tailgate, an electrically actuated lift, and an electrically actuated packer/ejector assembly). Such an all-electric vehicle body does not include any hydraulically actuated body systems. The chassis or vehicle body may include a battery (or batteries) that that are configured to power the all-electric body systems. The vehicle may further include a power take off (PTO) driven generator configured to charge the battery and a controller to control the generator and/or the PTO (e.g., as described in more detail below for various hybrid vehicle embodiments).

Moreover, it will also be understood that the vehicle body may include other systems requiring electrical power, for example, including vehicle and work lighting and onboard vehicle computer and camera systems (e.g., as disclosed in commonly assigned U.S. Patent Publication 2020/0247609).

The disclosed embodiments are not limited to any particular type or style of refuse vehicle. The vehicle may include a sanitation truck, a recycling truck, a garbage truck, a waste collection truck, etc. In FIG. 1, the depicted vehicle 10 is configured as a side loading refuse vehicle; including an electrically actuated side loader assembly configured to load refuse into the hopper 34 from alongside the vehicle. The disclosed embodiments are, of course, not limited in regard to any refuse loading configuration. For example, while not depicted on FIG. 1, the vehicle may also be configured as a front loading refuse vehicle including a front loading assembly configured to load refuse from the front of the vehicle. The vehicle may also be configured as a rear loading refuse vehicle, for example, configured for automatic or manual loading of refuse at the rear of the vehicle. Those of ordinary skill will readily appreciate that tailgates in front and side loading vehicles may be similarly constructed, while the tailgate in a rear loading vehicle is generally heavier and includes a built in hopper and compaction unit.

It will further be understood that the electrically and hydraulically actuated body systems employed by refuse vehicle 10 may depend on the type and configuration of the vehicle. For example, the vehicle 10 depicted on FIG. 1 includes a side loader 48 and may include an electrically actuated grabber (for grabbing a refuse container) and an electrically actuated side loader arm (configured to move the grabber in and out from the body and up and down with respect to the vehicle). The entire side loader assembly may be referred to as a lift.

Figure 2A:
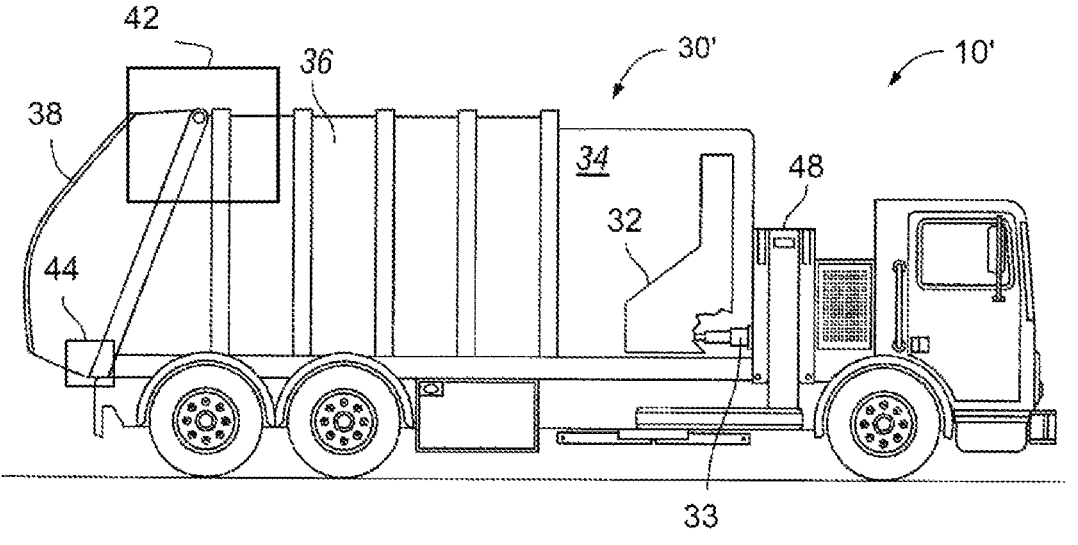
FIGS. 2A, 2B, and 2C (collectively FIG. 2) depict example refuse vehicles including various electrically actuated body systems.
Figure 2B:
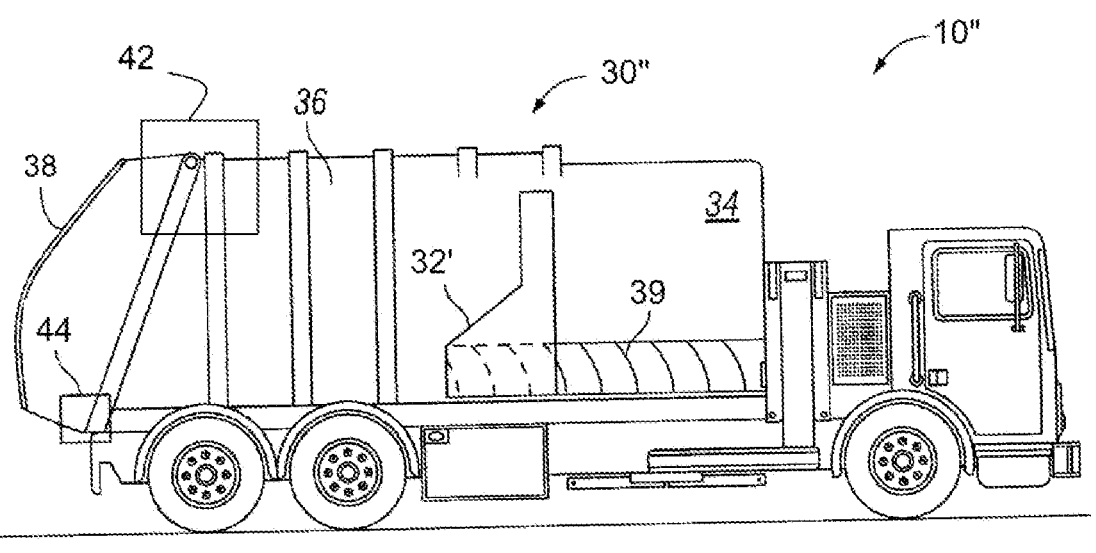
Figure 2C:
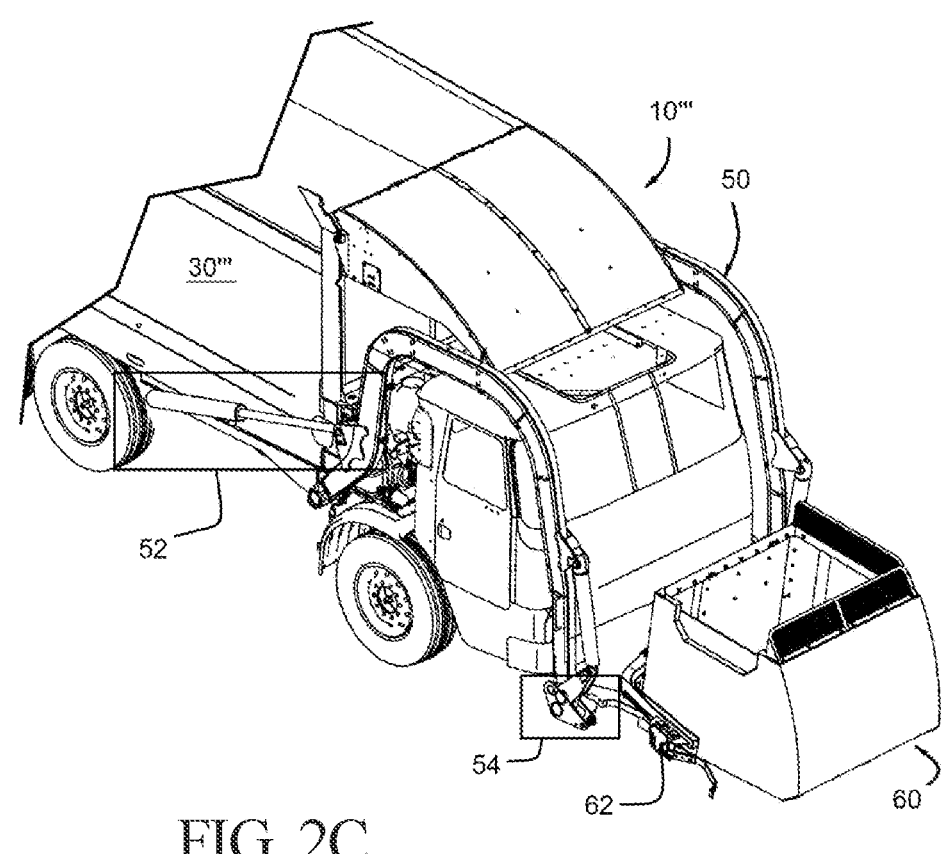

While the disclosed embodiments are not limited in these regards, various example electrically actuated body systems are depicted on FIGS. 2A, 2B, and 2C in refuse vehicles 10', 10", and 10'. As depicted on FIG. 2A, vehicle body 30' may include an electrically actuated tailgate open/close system 42 and an electrically actuated tailgate locking mechanism 44. While not depicted in FIG. 2A, the tailgate open/close system 42 and the tailgate locking mechanism 44 may be integrated into a single system that both closes and locks the tailgate or unlocks and opens the tailgate. Vehicle 10' may further (or alternatively) include a side loader assembly 48 configured to load refuse into the hopper. The side loader may include substantially any suitable electrically actuated grabber mechanism (for grabbing a refuse container) and an electrically actuated side loader arm (configured to move the grabber in and out and up and down with respect to the body 30').

FIG. 2A further depicts an ejector 32 (also referred to in the industry as an ejector panel, a packer, and a packer panel among other terms) deployed in the body 30'. The ejector 32 is configured to translate between forward (retracted) and rearward (extended) positions in a direction substantially parallel with an axis of the vehicle 10'. The vehicle 10' may optionally include an electrically powered ejector actuator 33 configured to translate the ejector 32 between the retracted and extended positions. The vehicle may include substantially any suitable ejector actuator 33, for example, including an electric motor powering a rack and pinion configuration in which the ejector panel is coupled to the rack or an electric motor powering a lead screw or ball screw. The disclosed embodiments are not limited to any particular electric actuation mechanisms.

It will be appreciated that the ejector 32 is generally retracted towards the front of the vehicle 10' when collecting refuse into the hopper 34, for example, via a side loader assembly 48 or a front loader assembly (not depicted). For example, in the embodiment depicted on FIG. 2A, the ejector may be retracted to the front of the hopper 34 (adjacent to the cab). When the hopper 34 is full (or at any other suitable time determined by the operator or onboard software systems), the ejector 32 may be electrically actuated toward the rear of the vehicle 10' to empty the hopper 34 and compact the refuse in the storage container 36.

In the vehicle embodiment 10" depicted on FIG. 2B, the ejector 32' may be retracted to the front side of the storage container 36 (between the storage container 36 and the hopper 34). In such embodiments, the hopper 34 may include an electrically powered auger 39 configured to transfer refuse from the hopper 34 to the storage container 36. The auger 39 may extend rearward through an opening in the ejector 32'. Rotation of the auger 39 (e.g., via an electric motor) is intended to empty the hopper 34 as well as compact (or partially compact) refuse in the storage container 36. From time to time, the ejector 32' may optionally be extended toward the rear of the body 30" to further compact the refuse in the storage container 36. The auger 39 may be continually rotated or only rotated when the hopper is sufficiently full to warrant refuse compaction.

Turning now to FIG. 2C, an example front loading vehicle embodiment 10''' is depicted including vehicle body 30'''. Refuse vehicle 10''' includes a front-loading assembly 50 configured to load refuse into the vehicle body 30''' (e.g., up and over the cab in the depicted embodiment). A front-loading assembly 50 may include electrically actuated loader arms supporting a plurality of forks that are sized and shaped to engage a dumpster or a carry can 60. The loader arms may be actuated using substantially any suitable electric actuators 52, for example including linear actuators. The forks may also be electrically actuated 54, for example, via an electric motor, to rotate the forks up and down about a pivot (not depicted). The loader arms and forks may alternatively be hydraulically powered via corresponding hydraulic pistons.

With continued reference to FIG. 2C, an all-electric carry can 60 is shown deployed on the front loader assembly 50. The carry can may include a side loader assembly 62 similar to the side loader assembly 48 described above. Side loader assembly 62 may be configured to load refuse into the carry can 60 and may include substantially any suitable electrically actuated grabber mechanism (for grabbing a refuse container) and an electrically actuated arm (configured to move the grabber in and out and up and down with respect to the can 60).

Figure 3A:
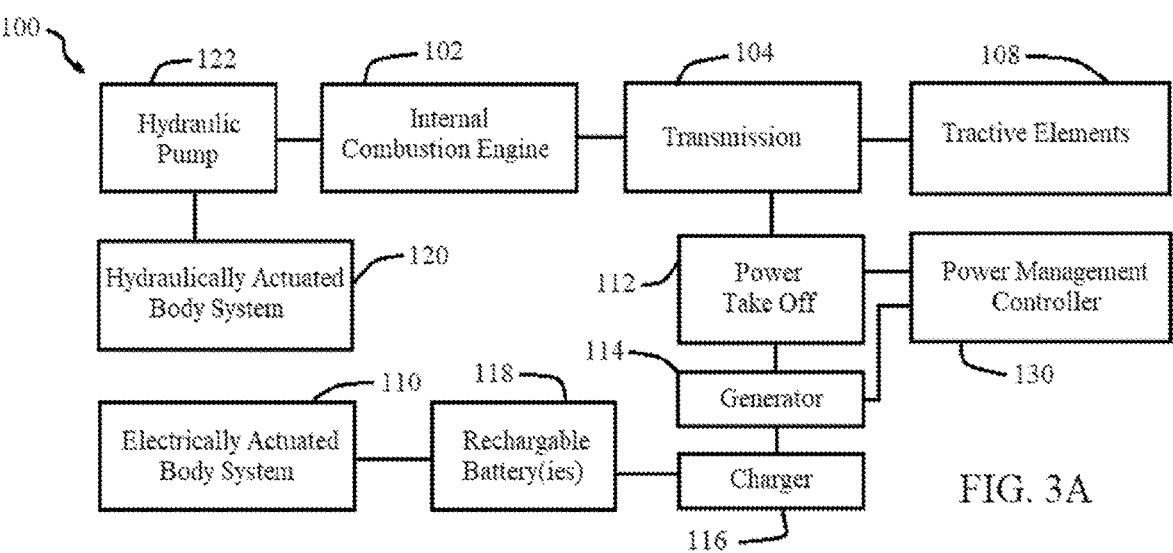
FIGS. 3A and 3B (collectively FIG. 3) depict schematic diagrams for example refuse vehicles including at least one electrically actuated body system and at least one hydraulically actuated body system.

Turning now to FIG. 3A, a schematic diagram is shown for an example refuse vehicle 100 including at least one electrically actuated body system 110 and at least one hydraulically actuated body system 120. As depicted the vehicle 100 includes an internal combustion engine (ICE) 102 (e.g., a diesel or natural gas-powered engine) engaged with a transmission 104. The ICE 102 and transmission 104 are configured to provide rotary power to tractive elements 108 to propel the vehicle 100. Vehicle 100 further includes a PTO 112 configured to selectively engage and disengage with the transmission 104. The PTO may include, for example, a hot-shift PTO that is configured to engage and disengage with the vehicle transmission via electrical actuation. When PTO 112 is engaged with the transmission it provides rotary power to a generator 114. The generator 114 may be configured to provide AC power (an AC voltage) to a battery charger 116 which in turn provides a DC power (DC voltage) to charge at least one rechargeable battery 118 (e.g., a bank of batteries). The battery(ies) is/are electrically connected with and provide electrical power to the electrically actuated body system(s) 110.

Vehicle 100 further includes an engine mounted hydraulic pump 122 configured to provide hydraulic power to the hydraulically actuated body system(s) 120. The pump 122 may be mounted to the ICE 102 in any suitable configuration, for example, to engage either the front or rear end of the main engine shaft. Vehicle 100 further includes a power management controller 130 configured to control certain aspects of the operation of the PTO 112 and the generator 114 (e.g., as described in more detail below).

Figure 3B:
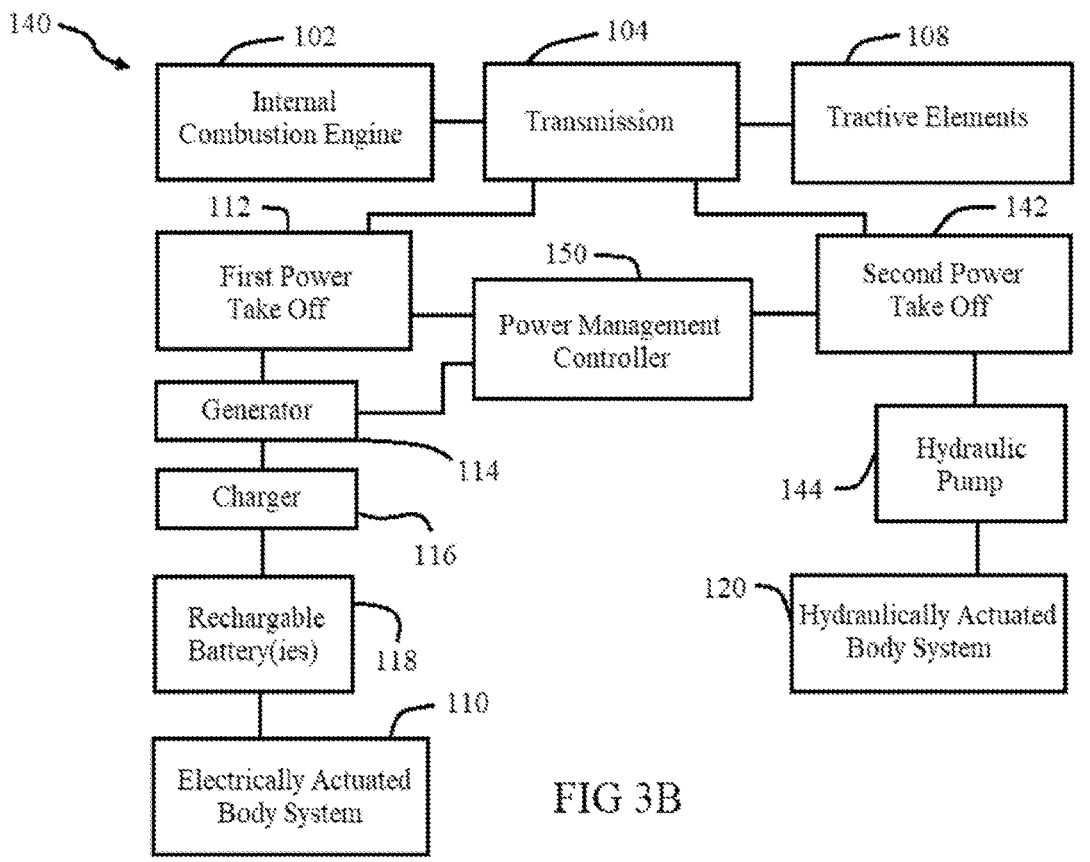

FIG. 3B depicts a schematic diagram of an alternative example refuse vehicle 140 including at least one electrically actuated body system 110 and at least one hydraulically actuated body system 120. As depicted (and described above with respect to FIG. 3A) the vehicle 100 includes an ICE 102 engaged with a transmission 104. The ICE 102 and transmission 104 are configured to provide rotary power to tractive elements 108 to propel the vehicle 140. Vehicle 140 further includes first and second PTOs 112, 142. In one embodiment, the first and second PTOs 112, 142 may both be configured to selectively engage and disengage with the transmission 104 (e.g., the first and second PTOs may both be hot shift PTOs). In an alternative embodiment, the first PTO 112 is configured to selectively engage and disengage with the transmission 104 while the second PTO 142 is always engaged with the transmission 104 (e.g., the first PTO 112 may be a hot shift PTO while the second PTO 142 may be a constant mesh PTO).

With continued reference to FIG. 3B, engagement of the first PTO 112 with the transmission provides rotary power to a generator 114. The generator 114 may be configured to provide AC power (an AC voltage) to a battery charger 116 which in turn provides DC power (DC voltage) to charge at least one rechargeable battery 118. The battery(ies) is/are electrically connected with and provide electrical power to the electrically actuated body system(s) 110. Engagement of the second PTO 142 with the transmission 104 provides rotary power to a hydraulic pump 144 which in turn provides hydraulic power to the hydraulically actuated body system(s) 120. Vehicle 140 further includes a power management controller 150 configured to control certain aspects of the operation of the first and second PTOs 112, 142 and the generator 114 (e.g., as described in more detail below).

It will be appreciated that the disclosed embodiments are not limited to the use of hot shift PTOs. As described above with respect to FIGS. 3A and 3B, PTO 112 may include a hot shift PTO that is configured to selectively engage and disengage with the transmission 104. In alternative embodiments, PTO 112 may be a constant mesh PTO that is always engaged with the transmission 104. In such embodiments the vehicles 100 and 140 may further include an optional clutch deployed between the PTO 112 and the generator 114, the clutch being configured to selectively engage and disengage the PTO 112 with the generator 114. It will be understood that actuation of such a clutch is analogous to actuation of a hot shift PTO in that the actuation selectively engages the transmission 104 with the generator 114 (through the PTO).

With continued reference to FIGS. 3A and 3B, the at least one battery (or battery pack) 118 may include substantially any suitable battery system, for example, including nickel batteries, lithium batteries, lead acid batteries, and the like and may be deployed substantially anywhere on the vehicle body or on the chassis. The battery pack(s) may be advantageously deployed on the underside of the body, for example, between adjacent frame rails on the chassis to lower the center of gravity of the vehicle. The disclosed embodiments are not limited regarding the battery type or location of deployment on the vehicle.

In FIGS. 3A and 3B, refuse vehicles 100, 140 include power management controllers 130, 150 configured to control certain aspects of PTO engagement with the transmission, generator function, and corresponding battery recharging. The controller may be configured to manage the load on the ICE by restricting battery charging operations to times when the hydraulic load is low. For example, battery charging may be inactivated (or disabled) when one or more of the hydraulically actuated body systems is in use. The controller 130, 150 may therefore advantageously mitigate against engine overloading (or prevent the engine from stalling or bogging down under excessive load).

In one embodiment, the controllers 130, 150 may be configured to cause the PTO 112 (or first PTO 112) to engage with the transmission when the ICE 102 is running (or idling) at an engine speed below a predetermined threshold (e.g., 800 revolutions per minute (rpm), 900 rpm, or 1000 rpm). Such engagement provides rotary power to the generator 114 and may (in certain embodiments) be operative to initiate battery charging.

The controllers 130, 150 may be further configured to cause the generator to provide an AC voltage to the battery charger when the PTO 112 (or first PTO) is engaged with the transmission 104 and when the generator rotation rate is within a predetermined range of rotation rate values (e.g., when the generator rotation rate is in a range from about 1000 to about 2500 rpm, from about 1200 to about 2500 rpm, from about 1200 to about 2400 rpm, or from about 1500 to about 2200 rpm). In certain embodiments, the generator 114 may include a switch (not shown) that may be closed by the controller 130, 150 when the PTO is engaged with the transmission and the generator rotation rate is within the predetermined range of rotation rate values. Opening the switch provides AC power (voltage) to the battery charger which in turn provides DC power (voltage) to the battery(ies) for charging.

The controller 130, 150 may be further (or alternatively) configured to disable battery charging when one of the hydraulically powered body systems is active. For example, the controller may be configured to disable battery charging when a vehicle controller (or onboard computer system) issues a command to actuate one of the hydraulically powered body systems or when hydraulic demand is sensed. In such embodiments, the generator switch may be opened to discontinue (or disable) battery charging (i.e., to break the connection between the generator and the battery charger). Moreover, the PTO 112 (or first PTO) may optionally be disengaged from the transmission to further conserve engine power. It will, of course, be appreciated that the above described switch may alternatively be deployed on the battery charger or any other suitable location for making and breaking the electrical connection between the generator and the battery(ies). The disclosed embodiments are not limited to any particular switch deployment.

In such embodiments in which the controller 130, 150 is configured to discontinue battery charging in response to actuation of one of the hydraulic body systems, the controller may be responsive to a command issued by an onboard vehicle controller to actuate one or more of the hydraulic body systems (such as a command to actuate the packer assembly). For example, the controller may open the above-described switch in response to such an actuation command. The controller may also be configured to sense or anticipate demand for (or use of) hydraulic power (e.g., by monitoring various sensor data including output pump pressure or an input pressure at the hydraulically actuated body system, a hydraulic piston position sensor, a proximity sensor, or a timer). The disclosed embodiments are not limited in this regard.

The disclosed vehicle embodiments may advantageously enable the vehicle operator to override (overrule) the power management controller. For example, a switch (or switches) may be deployed in the cab that enables the vehicle operator to switch between automatic and manual control of the battery charging operation. Such manual control may enable the operator to enable or disable battery charging irrespective of the controller logic.

While not depicted on FIG. 3, it will be appreciated that the disclosed refuse vehicles may further include auxiliary input and/or output electrical connectors that enable the batteries to be charged using an outside source of electrical power and/or enable the vehicle to provide electrical power to other vehicles or electrically powered devices (e.g., enabling the vehicle to be used as a generator).

Figure 4A:
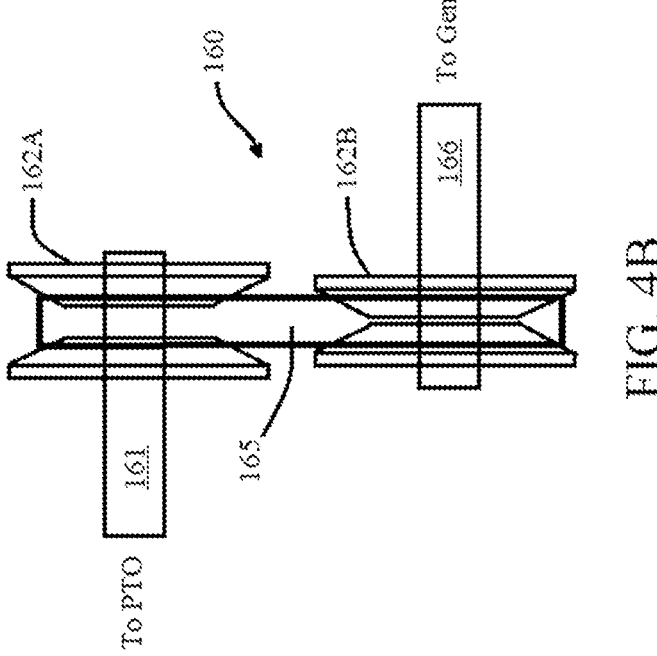
FIGS. 4A and 4B (collectively FIG. 4) depict one embodiment of an optional continuous variable transmission (CVT) deployed between the PTO and the generator.
Figure 4B:
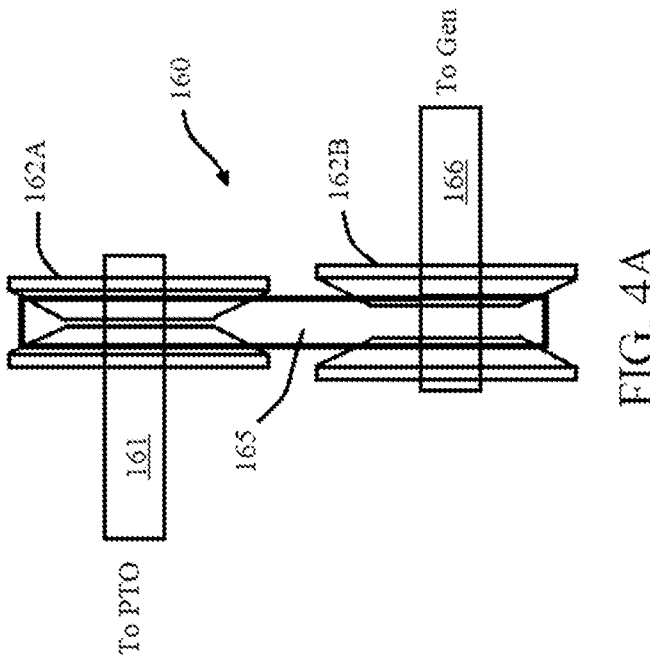

With continued reference to FIG. 3 and further reference to FIGS. 4A and 4B (collectively FIG. 4), certain ones of the disclosed embodiments may optionally include a continuous variable transmission (CVT) 160 deployed between the PTO 112 and generator 114. The CVT 160 is configured to transmit power from the PTO output shaft 161 to a generator input shaft 166 and to enable variable adjustment of a ratio of the rotation rate of the PTO output shaft 161 to the generator input shaft 166. The CVT 160 includes a variable pitch v-belt pulley (or sheave) 162A, 162B deployed on one of the shafts 161, 166. In the depicted embodiment, the CVT includes first and second sheaves 162A, 162B deployed on the corresponding PTO output shaft 161 and the generator input shaft 166. The CVT 160 further includes a belt 165 deployed about and rotationally coupling the sheaves 162A, 162B (and therefore the shafts 161, 166).

The sheaves 162A, 162B are configured to open and close axially along the shafts 161, 166. When the sheaves are opened (spread apart axially), they act like a small gear or pulley, and when they are closed (close together), they act like a large gear or pulley. At intermediate positions, they act like an intermediate sized gear or pulley. The rotation rate ratio of the PTO output shaft 161 to the generator input shaft 166 may be controlled via axially opening and closing the sheaves 162A, 162B. For example, in FIG. 4A, sheave 162A is closed (acting as a large pulley) and sheave 162B is open (acting as a small pulley). The corresponding rotation rate ratio is greater than 1. In FIG. 4B, sheave 162A is opened (acting as a small pulley) and sheave 162B is closed (acting as a large pulley). The corresponding rotation rate ratio is less than 1. It will, of course, be understood that a rotation rate ratio of 1:1 can readily be achieved by opening (or closing) each of the sheaves 162A, 162B to the same extent.

Figure 5A:
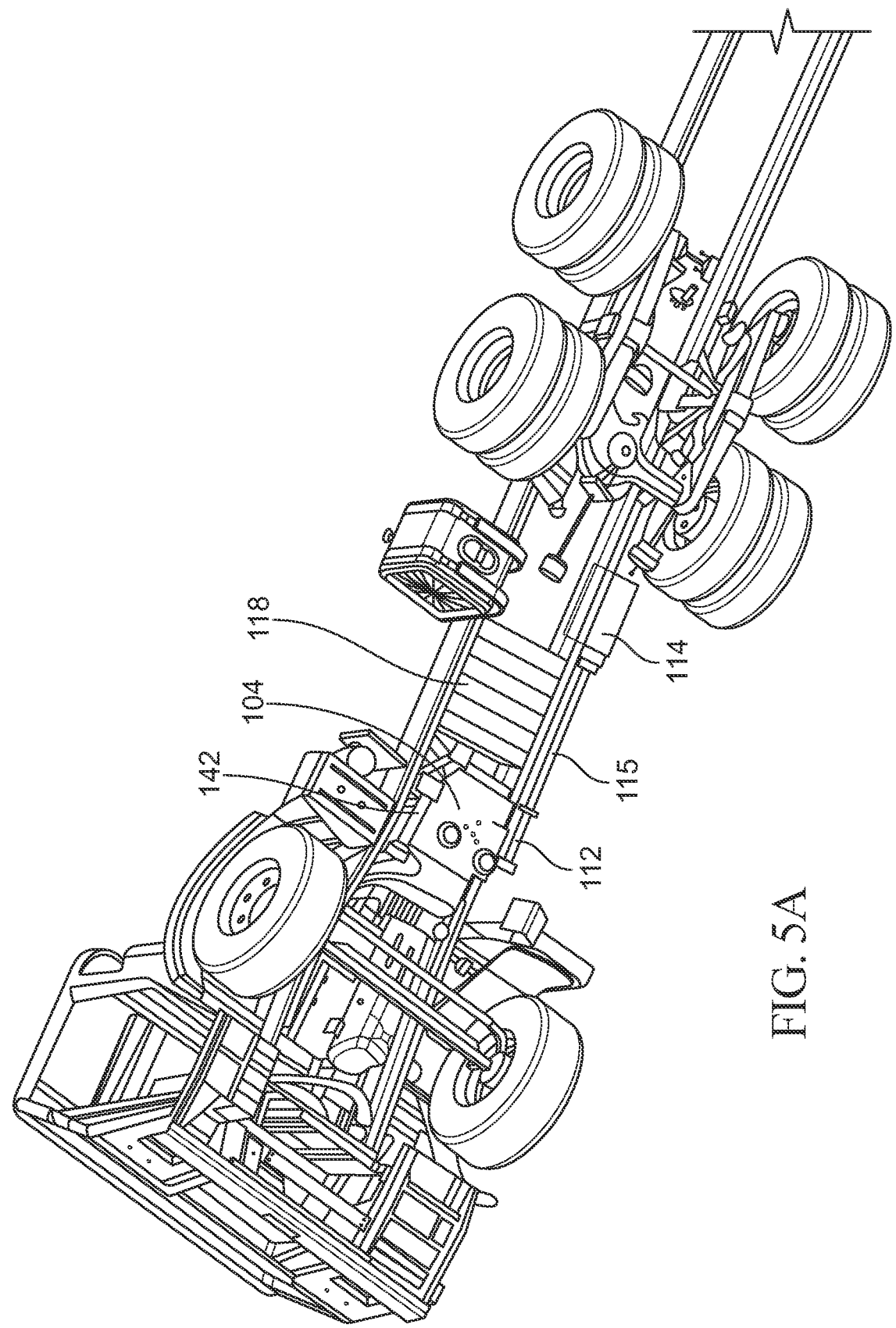
FIGS. 5A and 5B (collectively FIG. 5) depict an example chassis embodiment suitable for use with the example refuse vehicle depicted on FIG. 3B.
Figure 5B:

FIGS. 5A and 5B depict an example chassis embodiment suitable for use with vehicle 140 (FIG. 3B). In FIG. 5A, the first PTO 112 is mounted on an outside face of one of the chassis frame rails in proximity to the chassis supplied transmission 104. A PTO drive shaft 115 provides rotary power to the generator 114 when the PTO 112 is engaged with the transmission. The second PTO 142 is deployed between the frame rails in proximity to the transmission 104 and supplies rotary power to a hydraulic pump (not shown) when it is engaged with the transmission. The generator 114 is electrically connected with a battery charger 116 which is turn electrically connected with battery(ies) 118 (the electrical connectors are not shown but may, for example, be strapped to the side of one of the frame rails).

Figure 6:
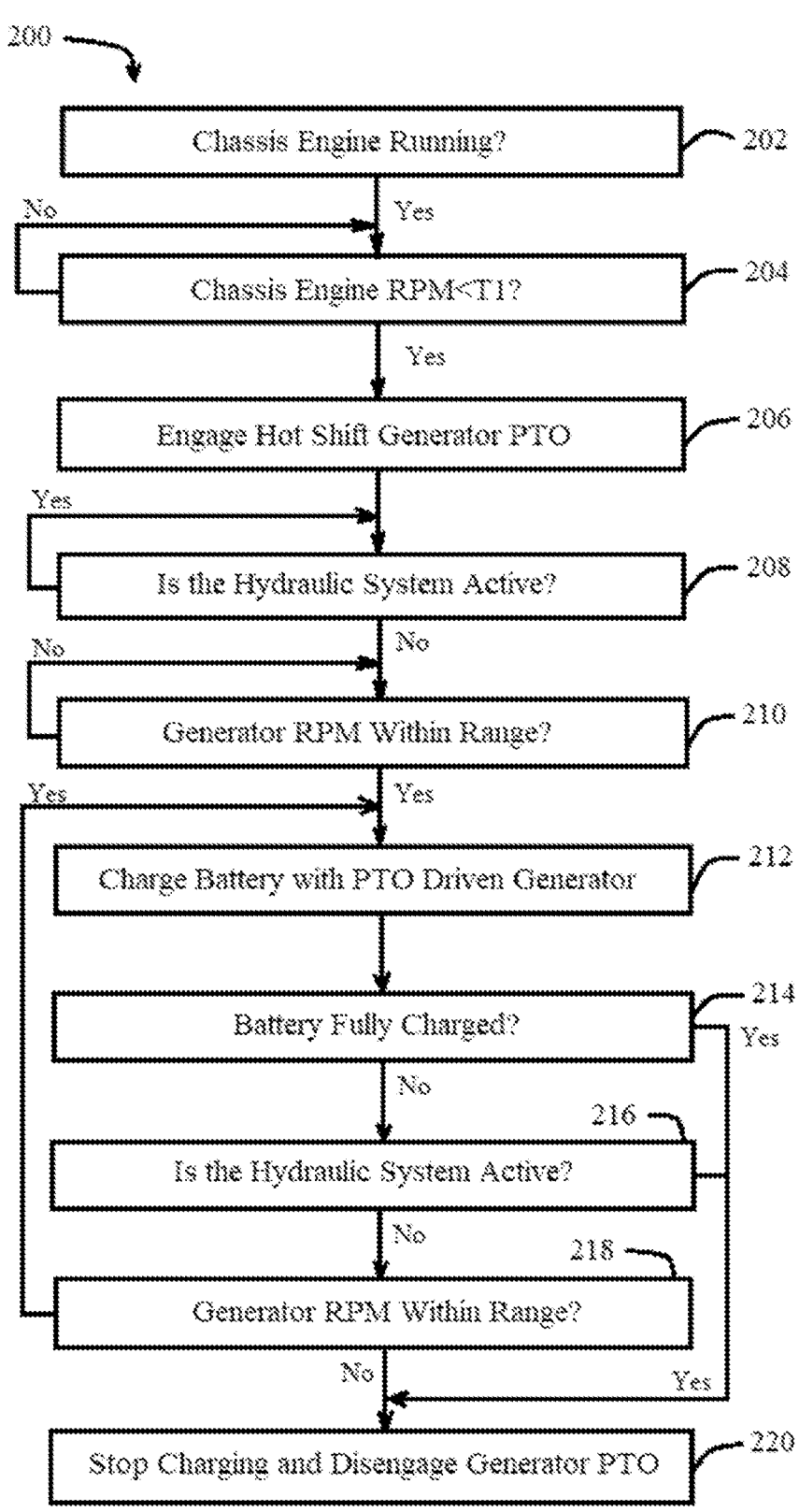
FIG. 6 depicts a flow chart of one example method (a control scheme) by which a power management controller may control battery charging.

FIG. 6 depicts a flow chart of one example method embodiment 200 by which a power management controller may control the battery charging operation. At 202, the controller determines whether the ICE is running. If the ICE is running, the controller further determines at 204 whether the engine speed (e.g., rpm) is below a predetermine threshold (e.g., 800 rpm, 900 rpm, or 1000 rpm). If the engine speed is above the threshold, the method repeats 204 (or simply waits) until the engine speed is below the threshold, at which time the generator PTO is engaged with the transmission at 206.

After engaging the PTO at 206, the method evaluates hydraulic system activity at 208. For example, the controller may determine whether the ICE is driving the hydraulic pump or whether any of the hydraulically activated body system(s) are in use. When the hydraulic system is active, the method repeats 208 (or waits) until the hydraulic system is inactive, at which time the method determines whether the generator rotation rate (e.g., rpm) is within a predetermined range of values at 210 (e.g., in a range from about 1000 to about 2500 rpm, from about 1200 to about 2500 rpm, from about 1200 to about 2400 rpm, or from about 1500 to about 2200 rpm). If the generator rotation rate is outside the predetermine range of values the method repeats 210 (or waits) until the rotation rate is in range, at which time battery charging is initiated at 212.

With continued reference to FIG. 6, the battery charge level, hydraulic demand, and generator rotation rate are monitored at 214, 216, and 218 while charging at 212. If the battery is fully charged at 214, if hydraulic system is active at 216, or the generator rpm is outside the predetermine range at 218, then the method stops charging and may optionally disengage the generator power take off at 220. Otherwise, the charging operation continues.

Method 200 is now described in more detail by way of a non-limiting representative refuse collection operation. While the disclosed embodiments are not limited in this regard, this exemplary operation makes use of a refuse vehicle that is equipped with an electrically actuated side loading lift and a hydraulically actuated ejector/packer assembly. Moreover, the refuse vehicle is employed in an example residential refuse collection operation (the disclosed embodiments are not limited in this regard).

At some point in the operation (e.g., at start-up or after the generator PTO has been disengaged), the controller checks to see that the chassis engine is running at 202 and that the engine rpm is below the threshold at 204. Both conditions may be met, for example, when the engine is idling at start-up, at a stop light or stop sign, at a pickup, or at other times during the route. At such times the controller may cause the generator PTO (e.g., a hot shift PTO) to engage the transmission at 206. After such engagement, the method checks hydraulic activity and generator rpm at 208 and 210 and initiates battery charging at 212 when there is no (or low) hydraulic activity and when the generator rpm is within the predetermined range of values.

As described above, the generator continues to charge the battery at 212 as long as the battery is not fully charged at 214, there is no (or low) hydraulic activity at 216, and the generator rpm remains in the predetermine range of rpm values at 218. These conditions may be met, for example, when the refuse vehicle is driving from one residential customer to the next or between residential neighborhoods. As the refuse vehicle slows and/or stops to make a pickup or slows and/or stops at a stop light or stop sign the engine rpm may fall below the predetermine range of values required for charging. When such a reduction in rpm is sensed at 218 the controller stops charging at 220 (e.g., via opening the above-described generator switch) and may optionally disengage the generator PTO from the transmission (depending on the vehicle and controller configuration). As the refuse vehicle resumes driving (e.g., to the next pick-up location), battery charging may be reinitiated at 212, for example, if there is no hydraulic system activity at 208 and the generator rpm returns to the predetermine range at 210.

As the refuse vehicle slows to a stop to make a pickup, the controller stops charging as described above. Meanwhile the battery(ies) provides/provide electrical power to the electrically actuated lift as it loads the refuse into the hopper. Battery charging may resume as the refuse vehicle drives between customer locations. However, from time to time, the ejector/packer assembly may be hydraulically actuated to remove collected refuse from the hopper (e.g., when the hopper is full or at some pick interval). Such ejector actuation commonly occurs after a pickup as the vehicle drives to the next pickup location. When the controller determines that the hydraulic packer is active at 208 or 216, battery charging is prohibited or stopped. Battery charging may resume at 212 when the hydraulic activity ceases and the engine rpm returns to the predetermined range of values (e.g., as the vehicle continues driving along the route and the refuse compaction operation is completed).

Turning now to FIGS. 7A and 7B, an alternative flow diagram is shown depicting an example controller decision tree 300 (controller logic) for a control method suitable for use with either or both of refuse vehicles 100 and 140 (FIGS. 3A and 3B). In this example, the vehicle may include either a hydraulic body (e.g., ejector/packer) and an electric lift or a hydraulic lift and an electric body. In the depicted decision tree, the controller first evaluates the vehicle configuration at 302 and 304. If the vehicle has two hot shift (or power shift) PTOs installed (302) the method proceeds to 304 and if not proceeds to 354 (FIG. 6B). If the vehicle has a hydraulic body and electric lift the method proceeds to 306. Otherwise, the method proceeds to 330.

At 306, the method checks the engine status. If the engine is running, the method checks engine rpm at 308. Otherwise, the method waits until the engine is running before checking engine rpm. If the engine rpm is less than a threshold (e.g., 900 rpm) at 308, then the generator PTO is engaged with the transmission at 310. Otherwise, the method waits until the engine rpm is less than the threshold before engaging the generator PTO. Once the generator PTO is engaged, the method checks the hydraulic activity and generator rotation rate at 312 and 314. If the hot shift body PTO or the body hydraulics are inactive and the generator rpm is within a predetermine range (e.g., in a range from 1500 to 2200 rpm), then the battery charging starts at 316. Otherwise, the method waits until both conditions are met.

Upon initiating battery charging, the method then checks the battery charge, the hydraulic activity, and the generator rpm at 318, 320 and 322. If the battery is not fully charged, the generator rpm remains within the predetermined range, and the hot shift body PTO or the body hydraulics are inactive, then battery charging continues. Otherwise, if the battery is fully charged, generator rpm is above or below the predetermined range, or hydraulic activity is sensed, then battery charging is stopped at 324 and the generator PTO is optionally disengaged from the transmission at 326. The method then again checks the engine status at 328. If the engine is running, the method proceeds to 308 if the generator PTO was disengaged at 326. Otherwise, the method proceeds to 312 if the generator PTO remains engaged with the transmission. If the engine is not running, the method may return to 302 or 308.

For a vehicle having an electric body (e.g., ejector and packer) and a hydraulic lift, the method checks the engine status at 330. If the engine is running, the method checks engine rpm at 332. Otherwise, the method waits until the engine is running before checking engine rpm. If the engine rpm is less than the threshold at 332, then the generator PTO is engaged with the transmission at 334. Otherwise, the method waits until the engine rpm is less than the threshold before engaging the generator PTO. Once the generator PTO is engaged, the method checks the hydraulic activity and generator rotation rate at 336 and 338. If the hot shift lift PTO or the lift hydraulics are inactive and the generator rpm is within the predetermined range, then battery charging starts at 340. Otherwise, the method waits until both conditions are met.

Upon initiating battery charging, the method checks the battery charge, the hydraulic activity, and the generator rpm at 342, 344 and 346. If the battery is not fully charged, the generator rpm remains within the predetermined range, and the hot shift lift PTO or the lift hydraulics are inactive, then battery charging continues. Otherwise, if the battery is fully charged, generator rpm is above or below the predetermined range, or hydraulic activity is sensed, then battery charging is stopped at 348 and the generator PTO is optionally disengaged from the transmission at 350. The method then again checks the engine status at 352. If the engine is running, the method proceeds to 332 if the generator PTO was disengaged at 350. Otherwise, the method proceeds to 336 if the generator PTO remains engaged with the transmission. If the engine is not running, the method may return to 302 or 332.

For vehicle configurations not including first and second hot shift (or power shift) PTOs, the method proceeds to 354 (FIG. 7B) to determine if the vehicle has a constant mesh PTO or an engine mounted hydraulic pump. If so, the method proceeds to 356, where the electric/hydraulic actuation configuration is evaluated. Otherwise, the method ends as the vehicle configuration is not supported. If the vehicle has a hydraulic body and electric lift, the method proceeds to 358. Otherwise, the method proceeds to 382.

At 358 the method checks the engine status. If the engine is running, the method checks engine rpm at 360. Otherwise, the method waits until the engine is running before checking engine rpm. If the engine rpm is less than the threshold at 360, then the generator PTO is engaged with the transmission at 362. Otherwise, the method waits until the engine rpm is less than the threshold before engaging the generator PTO. Once the generator PTO is engaged, the method checks the hydraulic activity and generator rotation rate at 364 and 366. If body hydraulics are inactive and the generator rpm is within the predetermined range, then battery charging starts at 368. Otherwise, the method waits until both conditions are met.

Upon initiating battery charging, the method checks the battery charge, the hydraulic activity, and the generator rpm at 370, 372 and 374. If the battery is not fully charged, generator rpm remains within the predetermined range, and the body hydraulics are inactive, then battery charging continues. Otherwise, if the battery is fully charged, generator rpm is above or below the predetermine range, or hydraulic activity is sensed, then battery charging is stopped at 376, and the generator PTO is optionally disengaged from the transmission at 378. The method then again checks the engine status at 380. If the engine is running, the method proceeds to 360 if the generator PTO was disengaged at 378. Otherwise, the method proceeds to 364 if the generator PTO remains engaged with the transmission. If the engine is not running, the method may return to 302 or 360.

For a vehicle having an electric body (e.g., ejector and packer) and a hydraulic lift, the method checks the engine status at 382. If the engine is running, the method checks engine rpm at 384. Otherwise, the method waits until the engine is running before checking engine rpm. If the engine rpm is less than the threshold at 384, then the generator PTO is engaged with the transmission at 386. Otherwise, the method waits until the engine rpm is less than the threshold before engaging the generator PTO. Once the generator PTO is engaged, the method checks the hydraulic activity and generator rotation rate at 388 and 390. If the lift hydraulics are inactive and the generator rpm is within the predetermined range, then battery charging starts at 392. Otherwise, the method waits until both conditions are met.

Upon initiating battery charging, the method checks the battery charge, the hydraulic activity, and the generator rpm at 394, 396 and 398. If the battery is not fully charged, the generator rpm remains within the predetermined range, and the lift hydraulics remain inactive then battery charging continues. Otherwise, if the battery is fully charged, the generator rpm is above or below the predetermined range, or hydraulic activity is sensed, then battery charging is stopped at 400 and the generator PTO is optionally disengaged from the transmission at 402. The method then again checks the engine status at 404. If the engine is running, the method proceeds to 384 if the generator PTO was disengaged at 402 or 388 if the generator PTO remains engaged with the transmission. If the engine is not running, the method may return to 302 or 384.

It will be understood that the disclosed refuse vehicles may include regenerative electrical power components such as road motion energy generators and regenerative braking to convert mechanical motion of the vehicle to electrical energy that may be used, for example, to recharge the battery(ies). Disclosed vehicle embodiments may further include charging rails (or other structures) to promote easy and efficient recharging (e.g., at a recharging station).

Although hybrid electric hydraulic refuse vehicles have been described in detail, it should be understood that various changes, substitutions and alternations can be made herein without departing from the spirit and scope of the disclosure as defined by the appended claims.

The invention claimed is:

1. A refuse vehicle comprising:
a vehicle chassis, the vehicle chassis including a chassis frame, an internal combustion engine (ICE), and a transmission coupling the ICE with a plurality of tractive elements;
a vehicle body on the vehicle chassis, the vehicle body including a refuse container and further including at least one electrically-powered body system and at least one hydraulically-powered body system, said body systems selected from a group consisting of a tailgate, a lift assembly, a refuse packing assembly, a refuse ejection assembly, and a carry can;
a first power module operatively coupled with the ICE, the first power module configured to provide rotary power to a hydraulic pump that is configured to provide hydraulic power to the at least one hydraulically-powered body system;
a second power module coupled with the transmission, the second power module configured to rotationally couple and decouple a generator with the transmission, the generator configured to charge at least one battery when rotationally coupled with the transmission, the at least one battery configured to provide electrical power to the at least one electrically-powered body system; and a controller configured to cause the second power module to rotationally couple the generator with the transmission when the ICE is running at a rotation rate below a threshold.

2. The refuse vehicle of claim 1, wherein the at least one electrically-powered body system comprises at least one of the lift assembly and the carry can.

3. The refuse vehicle of claim 1, wherein the at least one hydraulically-powered body system comprises at least one of the tailgate, the refuse packing assembly, and the refuse ejection assembly, and wherein the ICE is a natural gas-powered ICE, a propane-powered ICE, a gasoline-powered ICE, or a diesel-powered ICE.

4. The refuse vehicle of claim 1, wherein the second power module comprises a first power take off (PTO) configured for selective engagement and disengagement with the transmission, the first PTO configured to provide rotary power to the generator when engaged with the transmission.

5. The refuse vehicle of claim 4, wherein the first power module comprises a second PTO configured for selective engagement and disengagement with the transmission, the second PTO configured to provide rotary power to the hydraulic pump when engaged with the transmission.

6. The refuse vehicle of claim 5, wherein at least one of the first PTO and the second PTO comprises a hot-shift PTO.

7. The refuse vehicle of claim 1, wherein the second power module comprises a constant mesh PTO engaged with the transmission and a clutch deployed between the constant mesh PTO and the generator, the clutch configured to rotationally couple and decouple the generator with constant mesh PTO and the transmission.

8. The refuse vehicle of claim 7, wherein the hydraulic pump is an engine mounted pump and the first power module comprises a coupling between the ICE and the engine mounted pump.

9. The refuse vehicle of claim 1, wherein the first power module comprises a constant mesh PTO engaged with the transmission and configured to provide rotary power to the hydraulic pump.

10. The refuse vehicle of claim 1, wherein the first power module comprises a hot-shift PTO configured for selective engagement and disengagement with the transmission.

11. The refuse vehicle of claim 1, further comprising a continuous variable transmission (CVT) deployed between the second power module and the generator, the CVT configured to adjust a rotation rate ratio between an output shaft of the second power module and an input generator shaft.

12. The refuse vehicle of claim 1, wherein the controller is further configured to disable battery charging when the at least one hydraulically-powered body system is active.

13. The refuse vehicle of claim 1, wherein the controller is further configured to cause the generator to charge the at least one battery when the second power module is rotationally coupling the generator with the transmission and when a generator rotation rate is within a predetermined range of rotation rate values.

14. The refuse vehicle of claim 13, further comprising a switch configured to make and break an electrical connection between the generator and the at least one battery, wherein the switch is closed by the controller when the generator rotation rate is within the predetermined range of rotation rate values thereby providing AC power to a battery charger which in turn provides DC power to the at least one battery, wherein the controller is configured to open the switch when a demand is sensed.

15. A refuse vehicle comprising:

a vehicle chassis, the vehicle chassis including a chassis frame, an internal combustion engine (ICE), and a transmission coupling the ICE with a plurality of tractive elements;

a vehicle body on the vehicle chassis, the vehicle body including a refuse container and further including at least one electrically-powered body system and at least one hydraulically-powered body system, said body systems selected from a group consisting of a tailgate, a lift assembly, a refuse packing assembly, a refuse ejection assembly, and a carry can;

a power module coupled with the transmission, the power module configured to rotationally couple and decouple a generator with the transmission, the generator configured to charge at least one battery when rotationally coupled with the transmission, the at least one battery configured to provide electrical power to the at least one electrically-powered body system; and a controller configured to disable battery charging when the at least one hydraulically-powered body system is active.

16. The refuse vehicle of claim 15, further comprising a switch configured to make and break an electrical connection between the generator and the at least one battery, wherein the switch is closed by the controller when the at least one hydraulically-powered body system is active.

17. The refuse vehicle of claim 15, wherein the controller is configured to disable battery charging when a vehicle computer system issues a command to actuate the hydraulically-powered body system.

18. The refuse vehicle of claim 15, wherein the controller is configured to disable battery charging when actuation of the hydraulically-powered body system is sensed via at least one vehicle sensor selected from the group consisting of a pressure sensor, a hydraulic piston position sensor, and a proximity sensor.

19. The refuse vehicle of claim 15, further comprising a first hot shift power take off (PTO) configured for selective engagement and disengagement with the transmission, the first hot shift PTO configured to provide rotary power to a hydraulic pump when engaged with the transmission, wherein the power module comprises a second hot shift PTO configured for selective engagement and disengagement with the transmission, the second PTO configured to rotationally couple the generator with the transmission, and thereby provide rotary power to the generator, when engaged with the transmission.

* * * * *